United States Patent [19]

Yamamoto et al.

[11] Patent Number: 5,072,310
[45] Date of Patent: Dec. 10, 1991

[54] IC CARD FOR IMAGE PROCESSOR

[75] Inventors: Haruo Yamamoto; Tsukasa Matsushita; Hidechika Kumamoto, all of Osaka; Masaya Fujimoto, Hyogo, all of Japan

[73] Assignee: Mita Industrial Co., Ltd., Osaka, Japan

[21] Appl. No.: 523,344

[22] Filed: May 14, 1990

[30] Foreign Application Priority Data

May 24, 1989 [JP] Japan .................................. 1-130552

[51] Int. Cl.$^5$ ............................................. H04N 1/40
[52] U.S. Cl. .................................... 358/448; 358/444; 358/442; 358/443; 358/401
[58] Field of Search ............... 358/483, 400, 401, 448, 358/451, 442, 443, 444

[56] References Cited

U.S. PATENT DOCUMENTS 4,806,978  2/1989  Nakatani et al.
4,887,165 12/1989  Sato et al. .......................... 358/474
4,943,868  7/1990  Yoshinaga et al. ................. 358/444

Primary Examiner—Joseph A. Orsino
Assistant Examiner—Dov Popovici
Attorney, Agent, or Firm—Cushman, Darby & Cushman

[57] ABSTRACT

An integrated circuit (IC) card for use in an image processing machine, such as a digital copying machine. The IC card includes a first storage area for storing data for controlling said image processor and a second storage area for storing image data to be processed by said image processor.

1 Claim, 1 Drawing Sheet

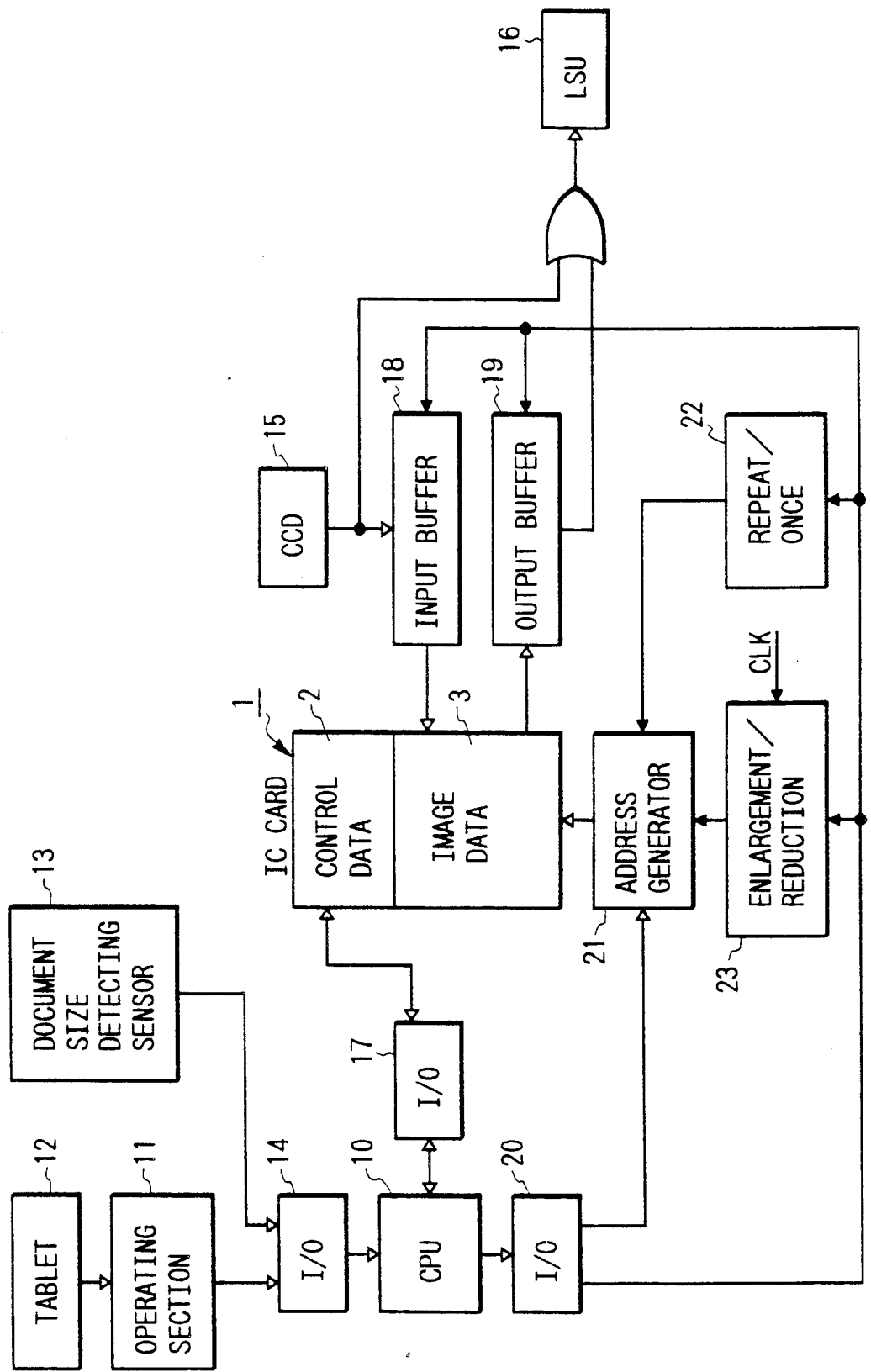

IC CARD FOR IMAGE PROCESSOR

BACKGROUND OF THE INVENTION

1. Field of the Invention

This invention relates to an IC card adapted for use in an image processor such as, for examples, a digital copying machine and a facsimile machine.

2. Description of the Related Art

Conventionally, image data processed by an image processor, such as a digital copying machine, is stored in a Central Processing Unit (CPU) of the image processor, and not in an IC card.

An image editing system which utilizes an IC card is shown in U.S. Pat. No. 4,806,978 - Nakatani et al (Feb. 21, 1989), the disclosure of which is incorporated herein by reference as if fully set forth. The '978 patent is directed to a system that includes: ". . . a "memory card" capable of storing edited image data in memory, a copying device to perform edited image copying based on data stored in said memory card which is removable, and an input unit for entering edit data in a memory card which is removable."

The IC card stores editing coordinate data and editing mode information. The IC card is connected to an editing input device and a copying machine on an offline basis. According to the '978 patent, the IC card stores control data required for processing data such as the editing coordinate data and editing modes for forming an image.

When an image is processed by an image processor; e.g., a copy is made by a digital copying machine, it is sometimes desired before copying that a size-reduced or area-specified copy be made or that the title of an image be decorated with a hatch or that graphic data be inserted in a specific area of the image.

Systems employing a conventional IC card that can store only control data have not been able to respond to the above needs.

SUMMARY OF THE INVENTION

Therefore, an object of this invention is to provide an IC card adapted for use in an image processor and capable of storing various data necessary for performing the image processing operation by the image processor.

Another object of the invention is to provide an image processing system utilizing such an IC card.

The invention provides an IC card which is adapted for use in an image processor. The IC card includes first and second distinct areas of memory. The first area is designated for storing data for controlling the image processor. The second area is designated for storing image data to be processed by the image processor. Both control data and image data required for image processing can be read simply by addressing a single IC card coupled to an image processor.

BRIEF DESCRIPTION OF THE DRAWINGS

The presently preferred embodiment of this invention will be described in detail with reference to the accompanying drawing.

The sole FIGURE is a block diagram showing the configuration of a digital copying machine including an IC card 1 in accordance with the present invention.

DETAILED DESCRIPTION OF THE PREFERRED EMBODIMENT

The FIGURE is a block diagram showing an example configuration of a digital copying machine system incorporating an IC card 1 according to this invention. The invention is not limited to a digital copying machine per se, but this is the presently preferred embodiment of the invention.

The size and shape of IC card 1 can be as shown in U.S. Pat. No. 4,806,978. Therefore, the constructions details of the card itself will be omitted. Of course, the IC card can be constructed in accordance with any desired size and shape. The IC card 1 has a two part storage. It includes a control data storage area 2 and an image data storage area 3.

Although in the FIGURE there are only two data areas shown for simplicity in describing the invention, IC card 1 may include other areas as well. For example, IC card 1 may include a central processing unit (CPU) area, other storage areas, and the like as the case may require.

The ratio of allocation of area between the control data storage area 2 and the image data storage area 3 is adjustable depending on the desired application of the IC card 1.

If IC card 1 is intended to function as a simulation card simulating various operations of a copying machine, the control data storage area 2 will have a relatively large capacity. However, if IC card 1 is used as a test pattern IC, the necessity of producing various test patterns will necessarily increase the capacity of image data storage area 3.

The digital copying machine system as shown in the FIGURE will now be described. The system includes a Central Processing Unit (CPU) 10 serving as its control center. An operating section 11 produces a cop mode setting signal. A tablet 12 supplies coordinate data. Document size data, detected by a document size detecting sensor 13, is provided to CPU 10 via an input-/output (I/O) interface 14.

CPU 10 controls copy processing according to the data provided to it. That is, the CPU 10 causes a Charge Coupled Device (CCD) 15 to read a document image and transfers data output from CCD 15 to a Laser Scan Unit (LSU) 16 thereby to form a desired copied image.

If the system has the IC card 1 already set therein (IC card 1 is removable), the system causes the IC card 1 to store the control data and/or the image data and reads the control data and/or the image data stored in the IC card 1 so that the system can control copy processing according to the data.

More specifically, when the IC card 1 is set in the system, control data storage area 2 is connected to CPU 10 through an I/0 interface 17. Thus, it is possible to store the control data in control data storage area 2 or read the stored control data therefrom.

Image data storage area 3 of the IC card 1 is connected to an input buffer 18 and an output buffer 19. Input buffer 18 buffers a signal from CCD 15 to transfer it to image data storage area 3. Output buffer 19 buffers the output of image data storage area 3 to transfer it to the LSU 16. Thus, in the image data storage area 3, not only the image data supplied from the CCD 15 can be written, but also the data therein stored can be read to be supplied to the LSU 16. Data to LSU is gated by a gate 50.

To control the writing and reading processes of the image data to and from the image data storage area 3, the following arrangement is provided. Input buffer 18 and output buffer 19 are supplied with enable signals from CPU 10 through an I/O interface 20, respectively. Each buffer 18 and 19 functions only when it has received the enable signal from the CPU 10.

Further, an address generator 21 is provided to generate an address based on address data supplied from CPU 10 through I/O interface 20 and to specify the generated address to image data storage area 3. As a result, image data is written to or read from the specified address in the image data storage area 3.

A switch 22 is provided for selecting reading of image data either repetitively or once when reading from the image data storage area 3. A magnification ratio setting circuit 23 selects whether the size of the image data is to be enlarged or reduced when reading the image data. Switch 22 and magnification ratio seeting circuit 23 are controlled by CPU 10, and apply a signal to the address generator 21 and change the address generated by address generator 21 in response to the control command from the CPU 10.

Switch 22 selects the repetitive reading mode when the image data stored in the IC card 1 is used for overlay copying. Since the data, e.g., a specific group of characters such as "MITA," is repetitively read and thus repetitively produced, this data can be utilized as a background pattern for a copied content.

Since the storage capacity of the image data storage area 3 in the IC card 1 is not very large, it would be more advantageous to use the IC card 1 for repetitive reading.

As a result of the above construction, this invention allows both control data and image data to be stored in a single IC card, thereby providing a handy IC card adapted for use in image processors.

What is claimed is:

1. A digital copying system comprising:
   a tablet for inputting instructions;
   an operating section for receiving instructions from said tablet;
   a document size detecting sensor for sensing a document size;
   a first buffer for receiving data from said operating section and said document size detecting sensor;
   a second buffer;
   a third buffer;
   a Central Processing Unit (CPU), for receiving data from said first buffer and exchanging data with said second and third buffers;
   an IC card having a control data section for storing data for controlling said central processing unit and an image data section for storing image data to be processed by said central processing unit, said IC card being coupled to said second buffer;
   an address generator, receiving input from said third buffer, for addressing memory of said IC card;
   an enlargement/reduction circuit, coupled so as to receive signals from said third buffer, for providing instructions to said address generator;
   a switch circuit, having a control input coupled to said third buffer, for controlling said enlargement/reduction circuit and said address generator;
   a Charge Coupled Device (CCD) for generating image data;
   a fourth buffer, having a control input coupled to said third buffer, for receiving image data from said CCD and providing said image data to said IC card;
   a fifth buffer, having a control input coupled to said third buffer, for receiving data from said IC card;
   a gate, having a first input coupled to said CCD and a second input coupled to said fifth buffer and an output; and
   a Laser Scan Unit (LSU) coupled to said gate output for writing data.

* * * * *